July 13, 1937.  G. R. APPELBERG  2,086,838
DOUBLE INDEX MECHANISM
Filed Feb. 24, 1936  3 Sheets-Sheet 3

INVENTOR.
GUSTAF R. APPELBERG
BY
ATTORNEY

Patented July 13, 1937

2,086,838

UNITED STATES PATENT OFFICE 2,086,838

DOUBLE INDEX MECHANISM

Gustaf R. Appelberg, Bridgeport, Conn., assignor to The Bullard Company, a corporation of Connecticut Application February 24, 1936, Serial No. 65,409

20 Claims. (Cl. 29—38)

This invention relates to machine tools and particularly to selectively operable means for controlling movement of an element of the machine in synchronism with other operations thereof.

The mechanism, by which selection and control of movements of elements is effected in accordance with the present invention, may be variously designed and arranged to adapt the same to the needs of any particular construction with which it may be associated. However, as applied to a multiple operation machine tool, the invention may be used to cause a work carrier to move, or index, either once or a plurality of stations between successive machining operations. When so employed, the invention may embody means synchronized with the indexing mechanism for initiating movement of a tool head at varying intervals in a time cycle of machine operations as desired.

One of the objects of the invention is to provide simple mechanism for selectively varying the operation of a movable element of a machine tool.

Another object of the invention is to provide improved means for altering the arc through which a rotatable work carrier of a multiple operation machine tool is moved between successive machining operations.

Another object of the invention is to provide means controlling movement of a tool head synchronized with the indexing mechanism and selectively variable to alter the timing of movements thereof.

These and other objects and features of the invention will appear from the following description thereof in which reference is made to the accompanying figures of the drawings which illustrate a typical embodiment of the invention as applied to a multiple spindle machine tool.

In the drawings:

Figure 4 is a horizontal sectional view of the mechanism of Figure 2 taken on the line 4—4 thereof.

Figure 1:
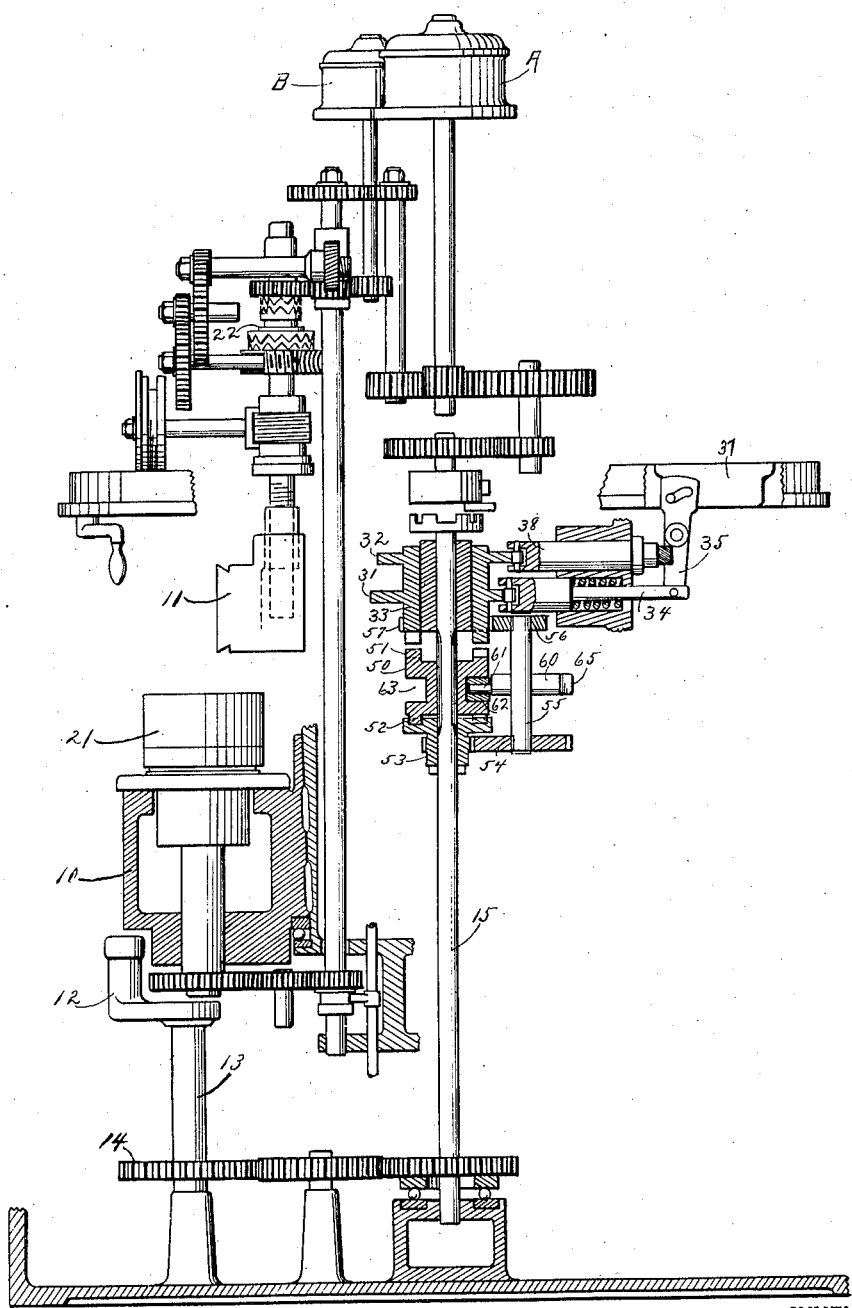
Figure 1 is a skeleton view of a portion of one type of machine tool embodying the present invention.

While the invention may assume various forms, it is here described as applied to a multiple operation machine tool wherein feed works for feeding and traversing movements of tool heads are operated in synchronism with the indexing movement. In this construction, there is a work carrier indexed periodically to move the work from an operating position beneath one tool head to an operating position beneath another. This indexing is effected by a rotatable crank arm carried by a suitable shaft preferably driven from a primary drive shaft, although it will, of course, be understood that movement of the carrier may be effected by any other suitable means desired.

The present invention provides control of the tool driving feed works by cams driven with the indexing shaft. The drive means for these cams includes selectively operable means for varying the position and speed of rotation thereof so that operation thereof occurs in the proper timed relation, either once in every indexing cycle or upon the completion of a plurality of indexing cycles. Furthermore, the operations of the cams, or selective mechanism, may be altered to vary the time in the cycle at which these operations are initiated to provide more, or less, time for the completion of movements of the clutches, switches, etc., as desired.

The mechanism for effecting this selection preferably embodies two independent drives for the cams, one of which is direct from the indexing drive shaft and the other is effected through a train of gears to vary the cam speeds to give the desired timing, a manually operable clutch, or other means being provided for selecting the drive connection used. The cams themselves also may be rotated relative to the drive shaft when the clutch is in neutral position to change the location of the high spots thereon with reference to the drive shaft so that timing of the operations is advanced or retarded.

While the invention is hereafter described as employed in a typical relation and as applied to one type of machine, the invention may be embodied in other machines and in other relations to effect selective operation and control of elements thereof.

Referring to the drawings, the invention is applied to a vertical multiple spindle machine tool of the type described in the application of E. P. Bullard, et al., Serial No. 108,494, for Machine tool, filed October 30, 1936. Two independently operable drive motors, A and B, are employed for the feed works; the motor A being a main motor for driving the feed works during feeding, and the spindles, as well as the indexing mechanism, while the motor B is a high speed reversible motor for traversing the tool heads. The construction comprises a spindle carrier 10 movable from one position to another to bring spindles 21 and their work successively into operative positions beneath tool heads 11. An indexing crank arm 12, preferably located at the loading station of the machine beneath the spindle carrier, is carried by a shaft 13 having a gear 14 secured to the lower end thereof and driven through an idler gear from an indexing drive shaft 15 located centrally within a column 16. The crank arm, in rotating, engages the carrier 10 to index the carrier with a Geneva motion during a portion of its complete rotation.

During single indexing movements, each rotation of the crank arm constitutes a single indexing cycle, the indexing movement of the carrier taking place during only a fraction of the rotation of the crank. The other part of the cycle is utilized for such functions as locking and unlocking the carrier etc., and for controlling the feed works to stop and reverse the traverse motor and to properly set the clutches. The latter are controlled by indexing cams 31 and 32. In a double indexing operation, the cams are so set as to make only one revolution to the double revolution of the indexing arm and a variation in their position is established so as to alter the point in the cycle at which they operate to compensate for the increased momentum of the carrier by virtue of its double index.

The mechanism employed for controlling the operation of the traverse means and feed works clutches referred to is shown in Figures 1, 2, 3, and 4 of the drawings as comprising cams 31 and 32 formed upon a cam carrier 33 surrounding the indexing drive shaft 15 and freely rotatable with respect thereto. The cam 31 actuates a slidable rod 34 which acts, through a lever 35, to operate both a traverse motor reversing switch 36 and a switch 37 to start and stop the traverse motor. In a similar way, the cam 32 operates through a rod 38 to actuate a shaft 39 by which feed works clutches 22 are operated, the details of the connection being shown in the application above-referred to and forming no part of the present invention. However, it will be apparent that additional cams may be used and the cams 31 and 32 may be employed as desired to actuate other elements or devices or to perform other functions at predetermined intervals and in timed relation with the operation of other elements of the machine; the feed works itself, being no part of the present invention, is only diagrammatically shown. One embodiment thereof is fully disclosed in the copending application hereinbefore referred to.

Figure 3:
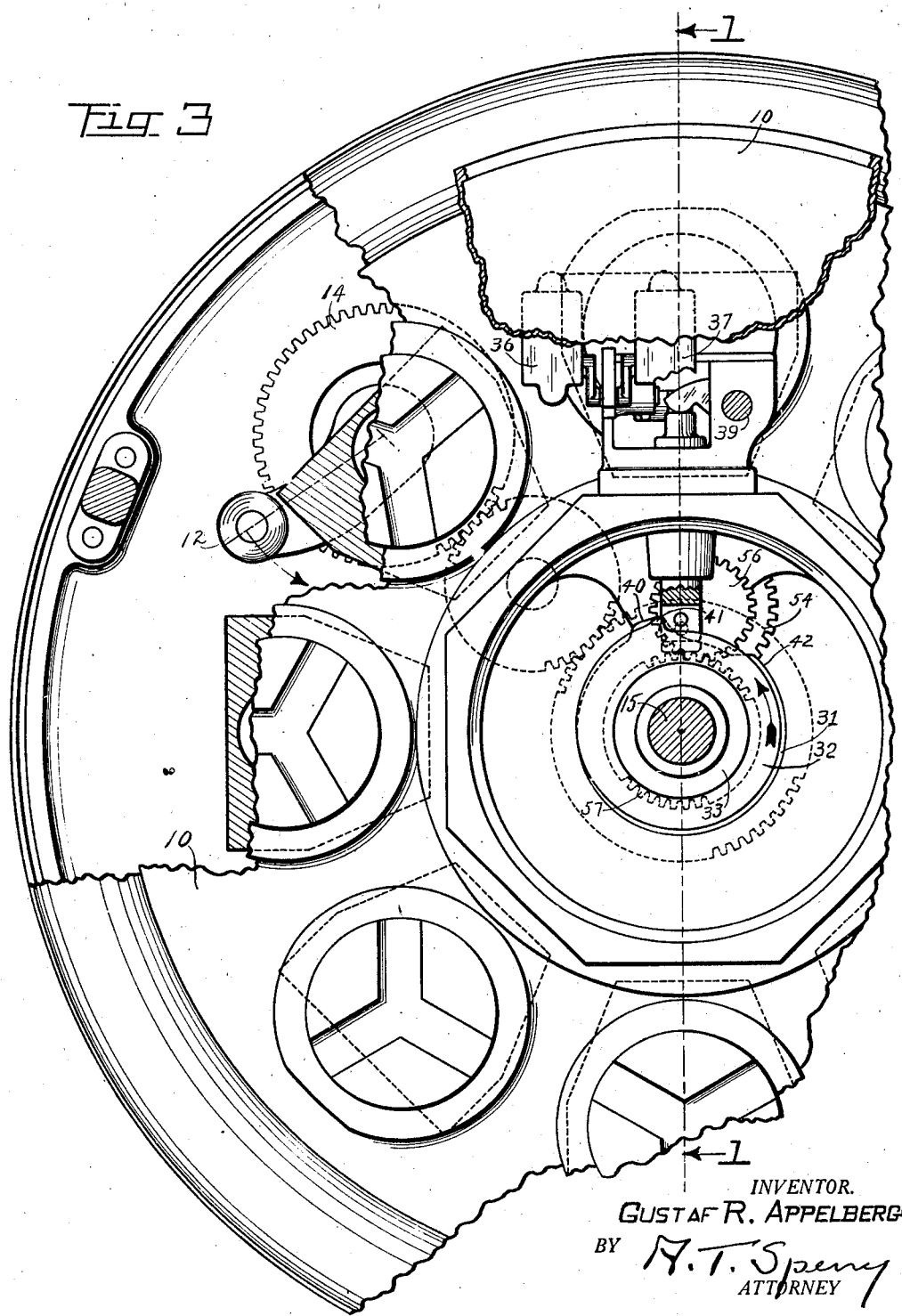
Figure 3 is a horizontal sectional view of the construction illustrated in Figure 2 taken on the line 3—3.

As seen in Figure 3, the cam 32 has a single high spot 40 positioned to cause the feed works clutches to be engaged, whereas the cam 31 has two high spots 41 and 42 to cause the switches 36 and 37 to be actuated at the beginning of the indexing movement; and at the beginning of the machining operation, the high spot 41 serving to actuate the switch 37 to stop the traverse motor, and the high spot 42 serving to start the traverse motor to move the tool heads down to their working positions to operate on the work.

Selective timing and control of the mechanism by the cams 31 and 32 may be obtained by driving the cam carrier at varying speeds, and the points in the time cycle at which the elements controlled thereby are operated may be varied by altering the angular position of the cam with respect to its drive clutch. By such adjustments, either single, or multiple, indexing of the carrier between machining operations may be provided and more, or less, time provided for the operation of the switches, clutches etc. between the end of the indexing and the start of the machining operation.

The desired variation in the operation of the mechanism is effected, in the form of the invention illustrated, by a collar 50 keyed to the drive shaft 15 to rotate therewith but slidable longitudinally thereon. The upper face of the collar 50 is formed with one or more spaced teeth, or projections, 51 for engaging complementary spaced teeth on the cam carrier 33 to drive the cam carrier directly with the shaft 15. By neutralizing the collar 50, the cam carrier may be rotated to position the cam carrier in a predetermined relation with respect to the drive shaft and thus establish the positions of the high spots on the cams and the points in the time cycle at which the traverse means and feed works clutches are actuated. When the collar 50 is in up position, the cams are driven directly from the main drive shaft and in synchronism therewith for single indexing.

Figure 2:
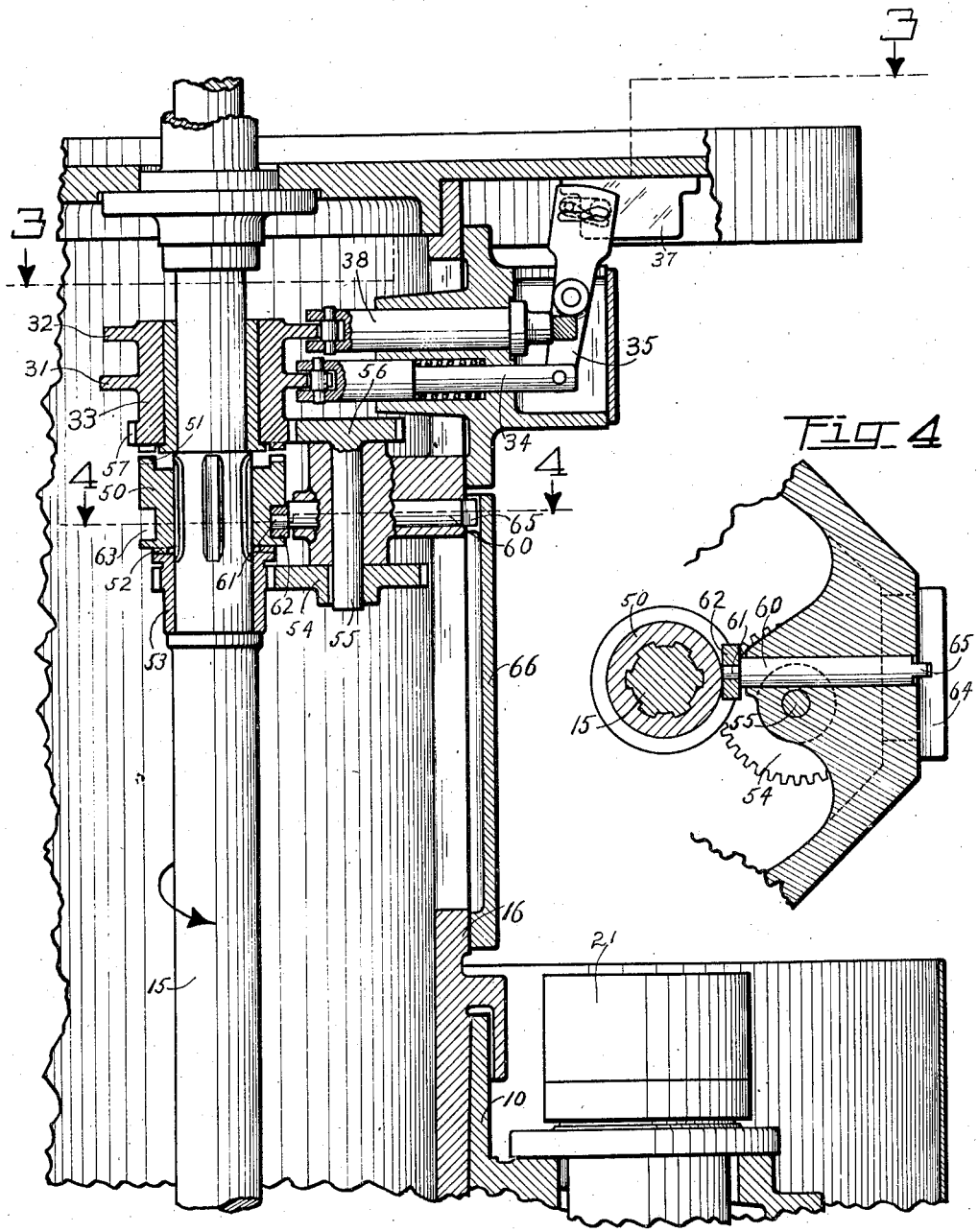
Figure 2 is a detailed vertical sectional view of a portion of a machine tool embodying a typical form of the invention.

The lower face of the collar 50 is formed with similar spaced clutch teeth, or projections, 52 for engaging complementary teeth, or recesses, in a collar 53 loosely mounted on the drive shaft and formed with peripheral gear teeth for engaging a gear 54 secured to a shaft 55. The upper end of the latter shaft is provided with a gear 56, engaging gear teeth 57 on an extension of the cam carrier 33 so that the latter will be driven through the gears at multiple speed when the collar 50 is in its lower position as shown in Figure 2. The projections, or teeth, 52 on the recesses on the collar 53 are displaced from those by which drive is established between the collar 50 and the cam carrier 33 so that the shaft 15 and collar 50 have to be rotated to permit engagement with the collar 53, and the location of the high spots on the cams are changed and the points in the time cycle, at which the traverse drive means and feed works clutches are actuated, are changed. Thus, by raising, or lowering, the collar 50, the cams 31 and 32 may be driven to operate the traverse and feed works mechanism in various timed relations with the operation of main drive shaft and the indexing crank arm.

For single indexing, there will be one rotation of the cams and carrier with every rotation of the crank arm and every indexing movement while the gears will be formed so that the cam carrier and cams will be rotated only one half turn with each rotation of the crank arm and each indexing movement when double indexing is desired.

When operating with double indexing, the cams are rotated at only half the speed of the drive shaft 15 and the indexing crank arm and, therefore, fifteen degrees of cam rotation occupies thirty degrees of the time cycle. Thus, ample time is allowed for bringing the spindles and feed works to their operation speeds before the down traverse movement of the tool heads is completed and the machining operation begins. Advance of the position of the cam carrier in double indexing is desirable in order that the down traverse of the tool heads and operation of the feed works clutches will occur at the same point in the alternate time cycles.

The operating means, by which selection and control of the timing and operation of the traverse and feed works is effected in the construction, shown in Figures 1, 2, and 4, is in the form of a shaft 60 having an eccentric pin 61 in the end thereof provided with a roller 62 extending into an annular groove 63 in the slidable collar 50. Rotation of the shaft 60 for raising and lowering the collar 50 may be effected by means of a handle 64 removably secured to a reduced end 65 of the shaft 60 by a slotted connection as shown in Figure 4. Ordinarily, during operation of the machine, the handle is removed and the end of the shaft 60 concealed by a cover 66. When a change in the indexing is desired, the cover member is lowered to expose the reduced end 65 of the shaft 60. The handle 64 is applied to the shaft and rotated until the collar 50 is moved from one position, say the lower position shown in Figure 1, to a neutral position out of engagement with the projections of either the cam carrier 33 or collar 53. The shaft 15 and collar 50 are then advanced fifteen degrees by manual means to bring the teeth 52 on the collar 53 into registry with those on the lower face of the collar 50. In this way, the position of the carrier, with respect to the shaft, is altered and thirty degrees of the time cycle are caused to effect fifteen degrees of movement of the cams. The collar 50 is then lowered to engage the collar 53, as shown in Figures 1 and 2, the handle 64 is removed and the cover 66 secured in place so that the end of the shaft is again concealed and unintentional change, or displacement, in the position of the collar 50 is prevented. Double indexing is thus provided very quickly and easily and timing of the operations in synchronism with the drive shaft and indexing movement are altered as desired.

Any number of cams may be actuated in the manner described and they may be used to control the operation of any suitable mechanism in predetermined timed relation and sequence and the operation of the elements may be selectively varied as desired by adjusting, or reforming, the cams and the driving means therefor. The invention may also be used in other relations and embodied in other forms of mechanism as desired without departing from the invention. In view thereof, it should be understood that the invention is not limited in its application to the indexing mechanism of machine tools and that the form of the invention herein shown and described is intended for illustrative purposes only and is not intended to limit the scope of the invention.

Having set forth the nature of my invention, what I claim is:

1. A multiple operation machine tool having a work carrier, indexing means for said carrier, a tool head movable to operate upon work on said carrier, means controlling movement of said tool head operable in timed relation to said indexing means and selectively operable means for varying the timed relation of said control means with respect to said indexing means.

2. A multiple operation machine tool having a work carrier, means for indexing said carrier, a drive shaft for said means, a tool head movable to operate upon work on said carrier, mechanism controlling movement of said tool head and selectively operable means for said controlling mechanism comprising alternative driving connections for said mechanism and a clutch for engaging either of said driving connections to provide alternative movements of said controlling mechanism in synchronism with said index drive shaft.

3. A multiple operation machine tool having a work carrier, means for indexing said carrier, a drive shaft for said means, a tool head movable to operate upon work on said carrier, mechanism controlling movement of said tool head, selective driving connections for actuating said control mechanism and a member rotatable with said drive shaft and movable to engage either of said driving connections.

4. A multiple operation machine tool having a work carrier, means for indexing said carrier, a drive shaft for said means, a tool for operating upon work on said carrier, mechanism driven in synchronism with said drive shaft for controlling operation of said tool and selectively operable means for varying the speed at which said control mechanism is driven including a member rotatable with said shaft, elements rotatable with respect to said shaft and engageable by said member and means for moving said member into engagement with either of said elements to drive said mechanism at different speeds.

5. In a multiple operation machine tool having a work carrier, means for indexing said carrier, a tool movable to operate upon work on said carrier and mechanism for altering the arc through which said carrier is indexed between successive movements of the tool to its operative position comprising two freely rotatable elements, gearing between said elements and a member driven in synchronism with said indexing means movable into engagement with either element to actuate the same.

6. In a multiple operation machine tool having a work carrier, means for indexing said carrier, a tool movable to operate upon work on said carrier and mechanism for altering the arc through which said carrier is indexed between successive movements of the tool to its operative position comprising control mechanism for said tool, two independent driving connections for said mechanism and a clutch movable to engage either driving connection.

7. In a multiple operation machine tool having a work carrier, means for indexing the carrier and a tool movable to operate upon work on said carrier, mechanism for altering the arc through which the carrier is indexed between successive movements of the tool to its operative position comprising mechanism for controlling movement of said tool, independent driving connections for said mechanism and a member driven by said indexing means movable into engagement with either of said driving connections.

8. In a multiple operation machine tool having a work carrier, means for indexing said carrier establishing a time cycle including one indexing movement in each cycle, a tool movable to operate upon work on said carrier and mechanism for moving said tool to its operative position at a predetermined point in either one or a plurality of time cycles, said mechanism being driven in synchronism with said means and movable to alternative driving positions with respect thereto.

9. In a multiple operation machine tool having a work carrier, means for indexing the carrier and a tool movable to operate upon work on said carrier, mechanism for altering the arc through which the carrier is indexed between successive movements of the tool to its operative position comprising cam actuated means controlling movement of said tool to its operative position.

10. In a multiple operation machine tool having a work carrier, means for indexing the carrier and a tool movable to operate upon work on said carrier, mechanism for altering the arc through which the carrier is indexed between successive movements of the tool to its operative position comprising a cam and alternative driving connections therefor driven in synchronism with said indexing means.

11. In a multiple operation machine tool having a work carrier, means for indexing said carrier establishing a time cycle including one indexing movement in each cycle, a tool movable to operate upon work on said carrier and mechanism for moving said tool to its operative position at a predetermined point in either one or a plurality of time cycles including a cam and alternative driving connections therefor driven in synchronism with said indexing means.

12. In a multiple operation machine tool having a work carrier, means for indexing said carrier establishing a time cycle including one indexing movement in each cycle, a tool movable to operate upon work on said carrier and mechanism for moving said tool to its operative position at a predetermined point in either one or a plurality of time cycles including control means driven in synchronism with said indexing means and an independent traverse drive for said tool actuated by said control means.

13. In a multiple operation machine tool having a work carrier, means for indexing said carrier establishing a time cycle including one indexing movement in each cycle, a tool movable to operate upon work on said carrier and mechanism for moving said tool to its operative position at a predetermined point in either one or a plurality of time cycles including control means, alternative driving connections therefor driven in synchronism with said indexing means and an independent traverse drive for said tool actuated by said control means.

14. A multiple operation machine tool having a work carrier, means for indexing said carrier, a drive shaft for said means, a tool movable to operate upon work on said carrier, mechanism for moving said tool to its operative position and a selectively operable member rotatable with said drive shaft for actuating said mechanism.

15. A multiple operation machine tool having a work carrier, means for indexing said carrier, a drive shaft for said means, a tool movable to operate upon work on said carrier, mechanism for moving said tool to its operative position and a selectively operable device for actuating said mechanism comprising a cam, two driving connections therefor and a member rotatable with said drive shaft and movable into engagement with either driving connection.

16. A multiple operation machine tool having a work carrier, means for indexing said carrier, a drive shaft for said means, a tool movable to operate upon work on said carrier, means for moving said tool to the operative position and a selectively operable device controlling operation of said mechanism comprising two driving connections therefor, a member rotatable with said drive shaft and movable into engagement with either driving connection and selectively operable means for moving said member.

17. A multiple operation machine tool having a work carrier, means for indexing said carrier, a drive shaft for said means, a tool movable to operate upon work on said carrier, means for moving said tool to the operative position and a selectively operable device controlling operation of said mechanism comprising a cam, two driving connections therefor, a member rotatable with said drive shaft and movable into engagement with either driving connection and selectively operable means for moving said member.

18. A multiple operation machine tool having a work carrier, means for indexing said carrier, a drive shaft for said means, a tool movable to operate upon work on said carrier, means for moving said tool to the operative position and a selectively operable device controlling operation of said mechanism comprising a cam carrier rotatable about said shaft, alternating connections for driving said cam carrier in synchronism with said shaft and a member rotatable with said drive shaft for establishing a driving connection with either of said connections.

19. In a multiple operation machine tool having a work carrier, means for indexing said carrier establishing a time cycle including one indexing movement in each cycle, a tool movable to operate upon work on said carrier and mechanism for moving said tool to its operative position at a predetermined point in either one or a plurality of time cycles, including an independently driven traverse for said tool, a cam for actuating the same, alternative driving connections for said cam synchronized with said indexing means, and a member driven by said means movable to engage either of said driving connections.

20. In a multiple operation machine tool a work carrier, indexing means for the carrier, a driven shaft for actuating said indexing means establishing a time cycle for the operations between the beginning of successive indexing movements, a tool movable to operate upon work on said carrier, an independent traverse drive for the tool and mechanism for varying the number of complete time cycles occurring between successive movements of the tool to its operative position comprising a cam for actuating said independent traverse drive, said cam being movable with a carrier surrounding said driven shaft, two alternative driving connections for the carrier synchronized with said shaft to rotate said cam and carrier once with either one or a plurality of completed time cycles and a member rotatable with said shaft and movable to engage either of said driving connections.

GUSTAF R. APPELBERG.